UNITED STATES PATENT OFFICE.

THEODORE SCHWARTZ, OF NEW YORK, N. Y.

IMPROVEMENT IN THE MANUFACTURE OF PARIS-GREEN.

Specification forming part of Letters Patent No. 6,327, dated April 17, 1849.

*To all whom it may concern:*

Be it known that I, THEODORE SCHWARTZ, of the city and county and State of New York, have discovered and invented new and useful Improvements in the Manufacture of Paris-Green; and, having applied to the Commissioner of Patents for a patent therefor, I do make and deliver the following written description of my said invention and discovery, and of the manner of using the same, in such manner as to enable any person skilled in the known or ordinary way of manufacturing paris-green to use my said improvements in the manufacture thereof; and I have accompanied this description with specimens of the ingredients and of the paris-green made by my improved processes, the nature of the case not requiring or admitting of drawings.

First. The useful object which is attained by my improved processes is the production with blue vitriol of a brilliant mineral green, rivaling in depth of color and permanancy the foreign manufactures of green from verdigris, and which can be sold cheaper than the imported verdigris-greens, and is much superior in color and quality to all mineral greens made by the processes in use from blue vitriol. The greens made by the processes in use, as well as the verdigris-greens, cannot be subjected to a high temperature without being decomposed and losing their color, and therefore must be dried at great expense by stove-heat, while the green made by my processes can be and is dried by steam, and for the same reason retains its color in use when exposed to such light and heat in the sun or otherwise as cause the ordinary greens to fade.

Secondly. All the materials and their proportions used in my process are not claimed as peculiar, but are assumed to be the same used in the ordinary manufacture of paris-green, and I therefore shall give no directions as to them, but confine my description entirely to the new processes discovered and invented by me, assuming a familiarity with the ordinary methods of manufacture.

In this specification I do not pretend to define the precise chemical actions which take place in my manufacture, but simply to furnish a clear description of the necessary mechanical processes; but for the purpose only of showing the importance of the improved processes (which are the fruit of repeated and long-continued experiments) it may be proper to state that I suppose the green produced by my processes to be a double salt of arsenite of copper and acetate of copper, the copper base being furnished by the blue vitriol, the acetic acid by the vinegar, and the carbonate of soda furnishing the soda with which the sulphuric acid set free from the vitriol unites, forming a sulphate of soda, while the disengaged carbonic acid escapes, producing the fermentation spoken of; and that the important object which I have attained by my processes is the effecting of crystallization more perfectly and in larger sized crystals than in the ordinary mode.

Thirdly. The materials I use in making such greens are white arsenic, blue vitriol, carbonate of soda, and very strong whisky vinegar.

A. The arsenic and soda I put together in water and dissolve them by the aid of steam, so as to form a hot saturated solution, and this may be done in iron kettles as well as in any other.

B. This hot liquor is then siphoned or otherwise transferred upon the blue vitriol, which is contained in a distinct vessel for that purpose, in order to effect its combination in solution, which is aided by a churning or other suitable motion.

C. The compound solution when thus produced is transferred into a very shallow vat or cooler, the depth of which should not exceed eighteen inches, (but I find in use twelve inches answers best,) and reduced to a homogeneous arsenite of copper by constant stirring until the fermentation entirely ceases. It is indispensable that, instead of the deep vats in use, these shallow vats should be employed, so that the necessary cooling shall be effected in not more than three hours.

D. The vinegar is then introduced rapidly, the compound liquor being gently stirred during its introduction, after which the whole is left at rest until it cools down to 100° Fahrenheit, which, as before stated, must be effected in not more than three hours and not less than two hours.

E. At the end of that time a large quantity of water (about one-fifth of a gallon for every pound of blue vitriol) is added, the object and effect of which is to check premature crystallization as well as properly to dilute the liquor.

The water is to be thus introduced in quantities just sufficient to keep the sulphate of soda from falling out of the solution, as the capacity of the water to hold it in solution diminishes with the temperature. If the solution is not thus maintained and the sulphate of soda is allowed to fall out, crystalization will commence prematurely, and small crystals will be formed and injure if not entirely spoil the result.

F. This brew is then allowed a rest for about a half an hour, after which the precipitate is thoroughly stirred up three or four times more at intervals of half an hour; and instead of introducing all the water at once, as before directed, part of it may equally well be introduced at either of these stirrings. The formation of the green is then complete, and the water being siphoned off, the draining is finished on linen strainers, after which the drying is effected by steam in the ordinary way practiced by white-lead manufacturers.

G. Fourthly. In lieu of dissolving the arsenic together with the soda, as already described, and pouring this solution on the vitriol, I have also discovered that the vitriol may be dissolved with the arsenic instead of the soda, and the solution of arsenic and vitriol thus obtained made to dissolve the soda with equal success and effect as the first-described method; but in this case the arsenic and vitriol must be dissolved, not in iron vessels, but in copper or other vessels not acted on by the vitriol.

Fifthly. In all the processes in use known to me the vitriol is dissolved separately, either in water or in the vinegar, or the vinegar is otherwise introduced too early, and deep vats are used and an excess of water, and no means whatever taken to retard the crystallization, so that the green produced is an inferior article, not a fast color, and is slimy in working, all which results from its imperfect formation in small crystals, while by my process either the dry vitriol or the dry carbonate of soda is dissolved without additional water by the compound saturated solution, which processes I have found by long experience necessary to the making a good article, as if the vitriol be dissolved separately, either in water or vinegar, either from the premature formation of acetate or hydrate of copper or from some other cause, it invariably injures the subsequent crystallization and produces smaller and imperfect crystals. The effect of using the smallest quantity of water and of the rest of my processes upon the very delicate operation of crystallization is evident.

What I claim as my invention, and desire to secure by Letters Patent, I specify and point out as follows, viz:

1. The process of dissolving the blue vitriol by pouring on it, while the vitriol is in a dry state, the hot saturated solution in water of arsenic and carbonate of soda, as described in paragraph B.

2. The process of dissolving the dry carbonate of soda by pouring on it the hot saturated solution in water of the arsenic and blue vitriol, as described in paragraph G.

3. The combination of the process described in paragraph B, or the process described in paragraph G, with all the several steps above described and marked with the letters A, C, D, E, and F.

4. The combination of either of the said processes described in section B and section G with any of the above-named steps described in sections A, C, D, E, and F.

New York, October 2d, 1848.

THEO. SCHWARTZ.

In presence of—
A. J. DODGE,
WILLIAM BRUERTON.